United States Patent
Choi

(10) Patent No.: US 8,238,523 B2
(45) Date of Patent: Aug. 7, 2012

(54) METHOD AND SYSTEM FOR PROVIDING RING BACK TONE SERVICE BY USING PLAY ANNOUNCEMENT MESSAGE IN INTELLIGENT NETWORK

(75) Inventor: Sung Soon Choi, Seongnam-si (KR)

(73) Assignee: Realnetworks Asia Pacific Co., Ltd., Seoul (KR)

( * ) Notice: Subject to any disclaimer, the term of this patent is extended or adjusted under 35 U.S.C. 154(b) by 1649 days.

(21) Appl. No.: 10/582,504

(22) PCT Filed: Dec. 6, 2004

(86) PCT No.: PCT/KR2004/003185
§ 371 (c)(1),
(2), (4) Date: Jun. 9, 2006

(87) PCT Pub. No.: WO2005/057962
PCT Pub. Date: Jun. 23, 2005

(65) Prior Publication Data
US 2007/0116244 A1    May 24, 2007

(30) Foreign Application Priority Data
Dec. 9, 2003 (KR) .......................... 10-2003-0089167

(51) Int. Cl.
*H04M 3/42* (2006.01)
*H04M 1/64* (2006.01)
(52) U.S. Cl. ................ 379/76; 379/207.08; 379/207.16; 455/414.1
(58) Field of Classification Search ............. 379/201.01, 379/76, 207.16, 221.08; 455/414.1
See application file for complete search history.

(56) References Cited

U.S. PATENT DOCUMENTS

| | | | |
|---|---|---|---|
| 5,692,033 A | 11/1997 | Farris | |
| 6,064,729 A | 5/2000 | Cookson | |
| 6,154,788 A * | 11/2000 | Robinson et al. | 710/8 |
| 7,142,656 B2 * | 11/2006 | Moody et al. | 379/207.16 |
| 7,277,691 B1 * | 10/2007 | Lundy et al. | 455/401 |
| 7,340,049 B2 * | 3/2008 | Batni et al. | 379/221.08 |
| 7,512,421 B2 * | 3/2009 | Kim et al. | 455/567 |
| 7,613,287 B1 * | 11/2009 | Stifelman et al. | 379/215.01 |
| 7,627,094 B2 * | 12/2009 | Kraft et al. | 379/76 |
| 7,706,518 B2 * | 4/2010 | Moody et al. | 379/207.16 |
| 7,801,293 B2 * | 9/2010 | Batni et al. | 379/207.16 |
| 7,844,044 B2 * | 11/2010 | Batni et al. | 379/257 |
| 7,873,148 B2 * | 1/2011 | Radziewicz et al. | 379/67.1 |
| 7,889,853 B2 * | 2/2011 | Sutcliffe | 379/207.16 |
| 7,894,834 B1 * | 2/2011 | Zhang et al. | 455/466 |
| 7,929,955 B1 * | 4/2011 | Bonner | 455/415 |
| 7,961,862 B2 * | 6/2011 | Batni et al. | 379/207.16 |

(Continued)

FOREIGN PATENT DOCUMENTS

JP        2003-348239 A      12/2003

(Continued)

*Primary Examiner* — Joseph T Phan
(74) *Attorney, Agent, or Firm* — McDermott Will & Emery LLP

(57) ABSTRACT

The present invention relates to method and system for providing a ring back tone service by using a play announcement message in an intelligent network. According to the present invention, there is no need for separate apparatus such as a signaling gateway, by removing the interoperation between a service control point and a coloring server. Thus, there is an advantage that additional cost does not occur.

20 Claims, 3 Drawing Sheets

U.S. PATENT DOCUMENTS

| | | | |
|---|---|---|---|
| 7,995,728 B1* | 8/2011 | Martin et al. | 379/201.02 |
| 8,019,072 B2* | 9/2011 | Stifelman et al. | 379/215.01 |
| 8,027,444 B1* | 9/2011 | Martin et al. | 379/201.01 |
| 8,027,455 B2* | 9/2011 | Moody et al. | 379/257 |
| 8,027,456 B1* | 9/2011 | Zhang et al. | 379/257 |
| 8,036,361 B2* | 10/2011 | Batni et al. | 379/210.01 |
| 8,059,800 B1* | 11/2011 | Martin et al. | 379/114.01 |
| 8,059,801 B2* | 11/2011 | Bareis | 379/114.13 |
| 2004/0120494 A1* | 6/2004 | Jiang et al. | 379/210.01 |
| 2004/0174983 A1* | 9/2004 | Olschwang et al. | 379/377 |
| 2005/0105706 A1* | 5/2005 | Kokkinen | 379/201.01 |
| 2005/0117726 A1* | 6/2005 | DeMent et al. | 379/142.01 |
| 2007/0047523 A1* | 3/2007 | Jiang | 370/352 |

FOREIGN PATENT DOCUMENTS

| | | |
|---|---|---|
| KR | 2002-0015869 A | 3/2002 |
| WO | WO 01/06735 A2 | 1/2001 |
| WO | WO 01/86931 | 11/2001 |
| WO | WO 03/071815 A1 | 8/2003 |

* cited by examiner

METHOD AND SYSTEM FOR PROVIDING RING BACK TONE SERVICE BY USING PLAY ANNOUNCEMENT MESSAGE IN INTELLIGENT NETWORK

RELATED APPLICATIONS

This application is the U.S. National Phase under 35 U.S.C. §371 of International Application No. PCT/KR2004/003185, filed on Dec. 6, 2004, which in turn claims the benefit of Korean Application No. 10-2003-0089167, filed on Dec. 9, 2003, the disclosures of which Applications are incorporated by reference herein.

TECHNICAL FIELD

The present invention relates to method and system for providing a ring back tone service by using a play announcement message in an intelligent network. More particularly, the present invention relates to method and system for providing a ring back tone service in such a way that a destination number of a receiving terminal is included in a play announcement message and based on this message, a coloring player plays a sound source corresponding to the destination number by receiving the same from the coloring server, wherein which the play announcement message is transmitted from a Service Control Point (SCP) to the coloring player, so as to directly interoperate the coloring player with the coloring server in an intelligent network.

BACKGROUND ART

With remarkable development in the field of computers, electronics and communication technologies, there are being provided various wireless communication services via a wireless network. The most basic wireless communication service is a wireless voice communication service which provides wireless voice communication for users of mobile communication terminals. This can provide a service without regard to time and location. Moreover, recently there has risen a wireless Internet service which provides users of mobile communication terminals with an Internet communication service through a wireless network.

Accordingly, subscribers of the mobile communication service can make communication with other users at any time and at any place by using a wireless communication service, while moving freely. In addition, subscribers can be provided with various information such as news, weather, sports, stocks, foreign exchange, traffic situations, or the like, in various forms such as characters, voice or images, through the wireless Internet service.

In the meantime, recently a ring back tone (hereinafter, RBT) service enabling various sounds designated by a receiver of a mobile communication terminal to sound as an RBT in a sender's mobile communication terminal or general telephone, or socalled a substitute RBT service is getting into the spotlight. The RBT service like above provides the sender with the RBT designated by the receiver. Namely, this is a service which enables the latest ballads, pop songs, sounds of birds or water, even pre-recorded self voice, etc, to be used as the RBT, instead of an existing mechanical RBT such as "tinkle-tinkle."

With provision of the RBT service like above, it is possible for the sender to have auditory satisfaction by listening to the sound designated by the receiver, not a routine and mechanical RBT.

In the meantime, an intelligent network (IN) is a structural concept which can be adopted in every communication network such as a Public Switched Telephone Network (PSTN), an Integrated Services Digital Network (ISDN), a Public Land Mobile Network (PLMN) and the like. Thus, the intelligent network enables both service providers and equipment providers to embody a network by defining a service independently to each other. In case that the intelligent network is introduced, it is possible to facilitate introduction of a new service on an intelligent network platform capable of providing the service more flexibly.

The structure of the intelligent network comprises a transfer layer for substantially transmitting communication information such as voice or data, based on a Service Switching Point (SSP); a signal layer for transferring control signals between elements of each net-work within the transfer layer; and a service layer for substantially controlling and managing a request for the intelligent network service, occurring in the transfer layer, through the signal layer, based on a Service Control Point (SCP).

The transfer layer comprises an existing telephone network, a public switched data network, an ISDN and the like. General subscribers ask for a service to the SSP through a communication terminal belonging to the transfer layer. The signal layer uses a SS NO. 7 signal method including data and control signals for operating and managing the transfer layer and a transaction processing signal for the intelligent network service, besides a signal for processing a general call. In addition, in the aspect of the IN, the signal layer serves as a relay layer connecting the lower transfer layer to the upper service layer. The service layer mainly comprises the SCP maintaining subscriber data and control information with respect to the intelligent network service, and a Service Management System (SMS). Therefore, the intelligent network service is enabled where the aforementioned layers are synthetically connected and functions thereof operate systernatically.

FIG. 1 is a block diagram illustrating configuration of a system for providing the conventional Ring Back Tone (RBT) service in an Intelligent Network (IN)

As illustrated in FIG. 1, the system for providing the conventional RBT service may comprise a Service Switching Point (SSP) 100, a Service Control Point (SCP) 102, an Intelligent Penpheral (IP) 104, a Coloring Server (CRS) 106 and a Signaling Gateway (SG) 108.

In order to embody the RBT service based on the IN, it is required not only the SSP 100, the SCP 102, and the IP 104 corresponding to the physical object of the intelligent network, but also the CRS 106 maintaining sound source information by each of users.

Referring to FIG. 1, interoperation between the SCP 102 and the CRS 106 is required to embody the RBT service based on the IN. However, since each of protocol used therein is different, the SG 108 is required to convert the protocol therebetween.

FIG. 2 is a drawing illustrating a process of providing the conventional RBT service in the IN.

The SSP 100 connected to a Mobile Switching Center (MSC) of a receiving terminal 110 which is required for call receipt, transmits information on the receiving terminal 100, e.g. information on whether the receiving terminal 110 subscribes to the RBT service, to the SCP 102 (S200). In case that a response message is received from the SCP 102 that the receiving terminal 110 subscribes to the RBT service (S202), the SSP 100 transmits a call connection requesting message to the IP 104 (S204) and receives a response message thereto (S206). Thus, a communication line is formed between the SSP 100 and the IP 104.

The IP 104 transmits an Assist Request Instruction (ARI) to the SCP 102 (S208). The SCP 102, having receiving the ARI, transmits a request message for a sound source to the SG 108 (S210), in order to inform the IP 104 of the sound source designated by a user of the receiving terminal 110. The SG 108 transmits a request message for a sound code to the CRS 106 (S212) and the CRS 106 transmits the sound code corresponding to an ID number of the receiving terminal 110 (S214). The SG 108, having receiving the sound code, transmits the same to the SCP 102 (S216). The SCP 102 includes the sound code in a Play Announcement message (PA message) so as to transmit the same to the IP 104 (S218). The IP 104 receives the PA message and then plays the sound source (S220).

The conventional RBT service based on the IN like above has the following problems.

First, since the SCP 102 and the CRS 106 have respectively different protocol, there is a defect that separate apparatus such as the SG 108, converting protocol therebetween, is required to embody the conventional RBT service. In addition, since there is no protocol engaged as an interoperation standard between the SCP 102 and the CRS 106, there is a problem that settlement between providers of the SCP 102 and those of the CRS 106 is required. Thus, in case of changing the SCP 102 or the CRS 106, there is another defect that it takes time to provide services.

Moreover, in a process for embodying the aforementioned conventional RBT service, the SCP 102 interoperates with the SSP 100, the IP 104 and the SG 108. Therefore, there is a problem that the SCP 102 is easy to be overloaded.

In the meantime, in the aforementioned process, it is apparent that the number of transmitting/receiving the messages, including the ARI, is 6 times before the IP 104 plays the sound. Thus, if the number is reduced, it may be expected to shorten the response time.

DISCLOSURE OF THE INVENTION

Technical Question

In order to solve the aforementioned problems, an object of the present invention is to provide a method and a system for providing a ring back tone service in such a way that a destination number of a receiving terminal is included in a play announcement message and based on this message, a coloring player plays a sound source corresponding to the destination number by receiving the same from the coloring server, wherein which the play announcement message is transmitted from a Service Control Point (SCP) to the coloring player, so as to directly interoperate the coloring player with the coloring server in an intelligent network.

Technical Solutions

In order to achieve the aforementioned object, the present invention provides a method for providing a ring back tone service by using a Play Announcement message (PA message) in an intelligent network, wherein the method comprises the steps of: (a) receiving information on a receiving terminal from a mobile switching center on the side of the receiving terminal that is required for call receipt; (b) in case that the receiving terminal subscribes to the ring back tone service, forming a communication line between the mobile switching center and the coloring player; (c) in case that the communication line is formed, receiving an assist request instruction from the coloring player; (d) transmitting the play announcement message including an identification number of the receiving terminal, to the coloring player; and (e) enabling a sound source corresponding to the identification number of the receiving terminal included in the play announcement message to be transmitted from a coloring server to the coloring player, so as to be played.

In addition, according to another object of the present invention, the present invention provides a system for providing a ring back tone service by suing a Play Announcement message I an intelligent network, wherein the system comprises: a Mobile Switching Center (MSC) transmitting information of a receiving terminal that is required for call receipt and interoperating with a coloring pla yer, so as to connect a call therebetween; a Service Control Point (SCP) receiving the information of the receiving terminal from the Mobile Switching Center (MSC), so as to transmit the Play Announcement message (PA message) including an identification number of the receiving terminal; a coloring player receiving a sound source corresponding to the identification number of the receiving terminal, so as to play the same in a sending terminal that has required the call receipt; and a Coloring server (CRS) transmitting the sound source corresponding to the identification number of the receiving terminal to the coloring player.

BEST MODE FOR CARRYING OUT THE INVENTION

Hereinafter, the preferred embodiment of the present invention will be in detail described with reference to the accompanying drawings. It should be noticed that reference symbols to components of each drawing are given, so that the same components may have the same symbols although the components are indicated on respectively different drawings. In addition, in case that it is determined that concrete description with respect to related common configuration or flnction might make the substance of the present invention indistinct, the detailed description related thereto is omitted.

Figure 1:
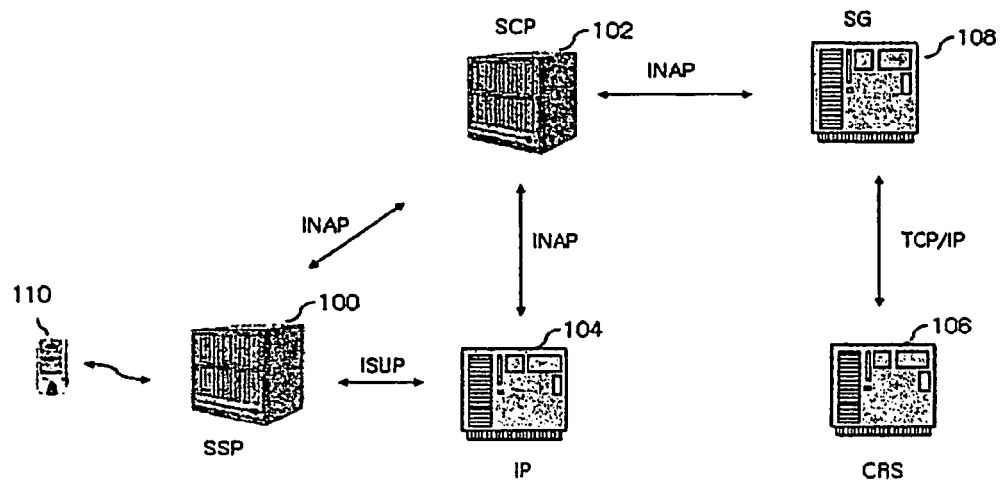
FIG. 1 is a block diagram illustrating configuration of a system for providing the conventional ring back tone service in an intelligent network.
Figure 2:
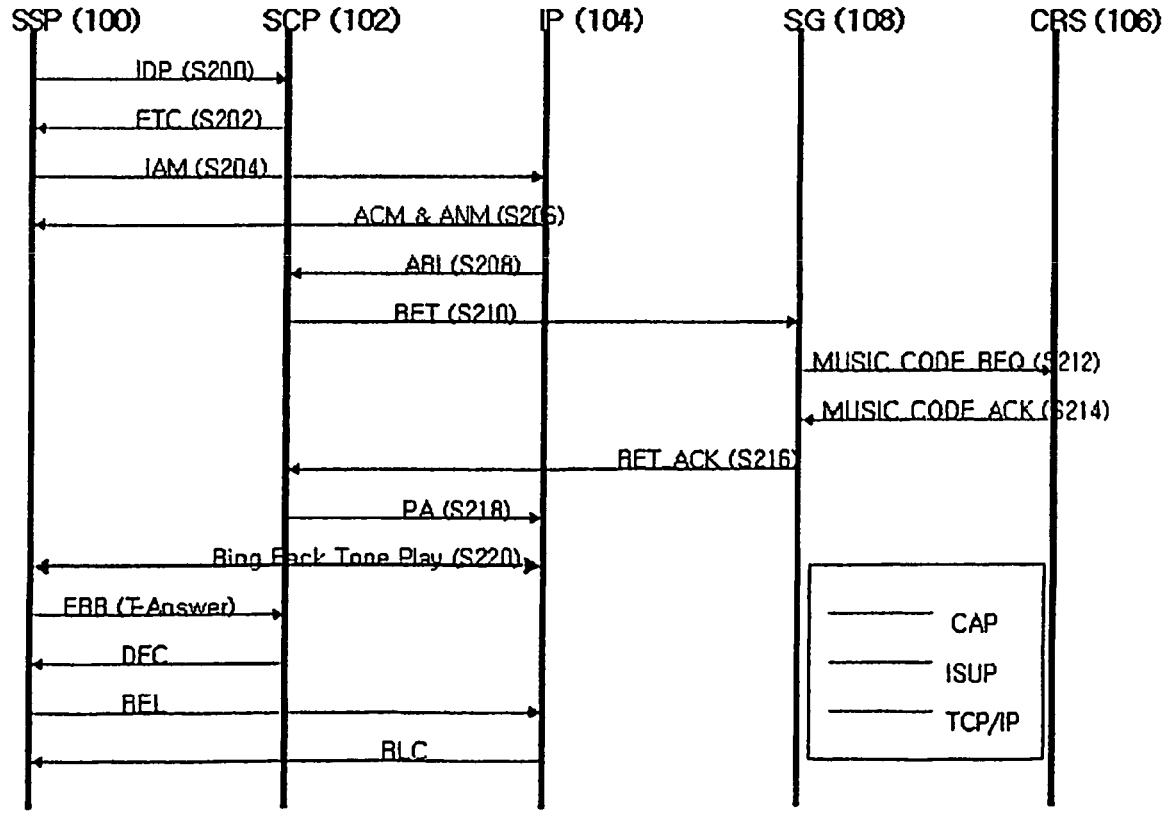
FIG. 2 is a drawing illustrating a process for providing the conventional ring back tone service in the intelligent network.
Figure 3:
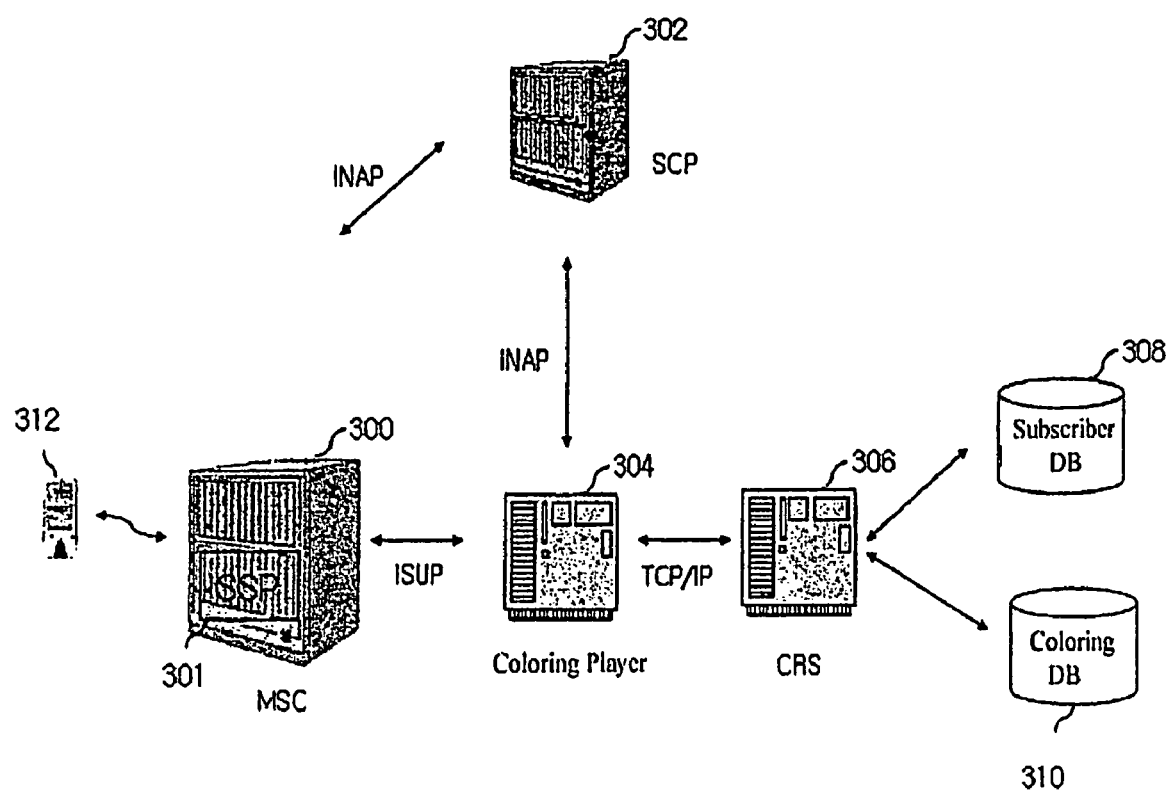
FIG. 3 is a block diagram briefly illustrating configuration of a system for providing a ring back tone service according to the preferred embodiment of the present invention.

FIG. 3 is a block diagram briefly illustrating configuration of a system for providing a Ring Back Tone service (RBT service) according to the preferred embodiment of the present invention.

As illustrated in FIG. 3, a system for providing the RBT service by using a Play Announcement message (PA message) in an intelligent network according to the preferred embodiment of the present invention may comprise a Mobile Switching Center (MSC) 300, a Service Control Point (SCP) 302, a coloring player 304, a Coloring Server (CRS) 302, a subscriber database (308), a coloring database (310), a receiving terminal (312), and the like.

The MSC 300 according to the preferred embodiment of the present invention transmits information on the receiving terminal 312 required for call receipt, to the SCP 302 and performs a call connection by interoperating with the Coloring player 304. The MSC 300 according to the preferred embodiment of the present invention includes a Service Switching Point (SSP) 301 supporting the entire access of the intelligent network.

The SSP 301 provides users with network access or a switching fuiction required to connect a call. In addition, the SSP 301 provides the entire access with respect to a relevant capacity group of the intelligent network. For this, the SSP 301 comprises a sensing capacity for sensing a request for an intelligent network service, a communicating capacity for communicating with other physical objects including the SCP 302 and an Intelligent Peripheral (IP), and a responding capacity with respect to an instruction transmitted from other physical object. The SSP 301 performs a Call Control Function (CCF), a Call Control Agent Function (CCAF) and a Service Switching Function (SSF).

The SCP 302 according to the preferred embodiment of the present invention receives information on the receiving terminal 312 from the MSC 300, so as to transmit a PA message including an ID number of the receiving terminal 312.

At this time, communication protocol between the MSC 300 and the SCP 302 is Intelligent Network Application Protocol (INAP). Protocol between intelligent network nodes (SSP-SCP, SSP-IP) adopts INAP recommended in ITU-T IN CS-1 Q.1218 (CS-2 is systematized into Q.1228 and CS-3 into Q.1238). INAP defines protocol of an application layer for supporting interaction between physical objects. Sub protocol supporting INAP may representatively adopt signaling system No. 7 (SS No. 7), wherein other signaling system may be used. INAP receives a request for operation transaction transmitted from an intelligent network call transaction part and drives an appropriate Application Service Element (ASE), thereby transacting generation of operation and response thereof. In addition, INAP is in charge of componentization of the generated operation, and transmits the same to the SCP 302 that is distributed within the network or operates a communication procedure for a bearer channel control with the IP. INAP is positioned between an Application Process (AP) and a Transaction Capability Application Part (TCAP) and in charge of transaction of operation related to the intelligent network service.

In the meantime, information on the receiving terminal 312 transmitted from the MSC 300 to the SCP 302 may be an ID number of the receiving terminal 312 or information on additional service subscription thereof. In case that an Assist Request Instruction (ARI) is received from the Coloring player 304, the SCP 302 generates and transmits the PA message by using information on the receiving terminal 312 received from the MSC 300. In addition, in case that a call-connection request message is transmitted from the MSC 300 to the Coloring player 304, the call connection request message is transmitted together with an ID number of a receiving terminal (not illustrated) having requested the call connection.

Since the SCP 102 of the aforementioned conventional RBT service interoperates with the CRS 106, the sound source of a RBT to be played is included in the PA message transmitted from the conventional SCP 302. However, since the SCP 302 according to the preferred embodiment of the present invention does not interoperate with the CRS 306, a random value is stored in a sound source filed for a RBT to be played and the ID number of the receiving terminal 312 is stored in an extension field.

In the meantime, there is a case that an ID number of a receiving terminal (not illustrated) having requested a call connection is not included in a call connection request message transmitted to the Coloring player 304 from the MSC 300, according to the SSP 301 comprised therein 300. In the case like above, the ID number of the receiving terminal (not illustrated) is also transmitted together with that of the receiving terminal 312 by being included in the PA message transmitted from the SCP 302.

The Coloring player 304 according to the preferred embodiment of the present invention receives a sound source corresponding to the ID number of the receiving terminal 312, so as to play the same in the receiving terminal (not illustrated) having requested call receipt.

At this time, the Coloring player 304 is a physical object corresponding to the Intelligent Peripheral (IP) in the intelligent network. The IP is a physical object providing special resources which are hard to be provided by a switching point, in order to support input/output of various information between communication users and the network. In addition, the IP also provides recourses which may have economical or structural advantages, although the same may be provided by the switching point. Namely, the IP provides smooth interaction between users and the network, with resources such as apparatus for synthesis of voice/language and recognition thereof, a Dual Tone Multi Frequency (DTMF) digit collector, an audio conference bridge, an information distribution bridge, a tone generator and the like. The IP according to the preferred embodiment of the present invention is a physical object for playing the RBT in the terminal and is named as the Coloring player 304.

In case that the receiving terminal 312 according to the preferred embodiment of the present invention subscribes to the RBT service according to the preferred embodiment of the present invention, a communication line is formed between the MSC 300 and the Coloring player 304. In case that the communication line is formed therebetween, the Coloring player 304 transmits an Assist Request Instruction (ARI) to the SCP 302.

So that the Coloring player 304 may ask the CRS 306 for information on the RBT sound source of the receiving terminal 312, the ID number thereof 312 is required. The SCP 302 transmits the ID number information on the receiving terminal 312 to the PA message. At this time, the Coloring player 304 recognizes only parameter promised to transfer the ID number of the receiving terminal 312, from the PA message received from the SCP 302 and ignores a value to be transferred to other parameters. Therefore, in case that the SCP 302 transmits the PA message, a random value is input into a parameter in relation to which sound be played.

In the meantime, in case that the ID number of a sending terminal (not illustrated) having requested a call connection is not included in a call connection request message transmitted from the MSC 300 to the Coloring player 304, the SCP 302 transmits ID number information on the sending terminal (not illustrated) to the PA message, together with ID number information on the receiving terminal 312. At this time, the Coloring player 304 recognizes a parameter promised to transfer both the ID number of the receiving terminal 312 and the ID number of the receiving terminal (not illustrated), from the PA message.

According to the preferred embodiment of the present invention, in order to find out information on the RBT sound source of the receiving terminal 312, the Coloring player 304 directly interoperates with the CRS 306 by using the ID number of the receiving terminal 312 received from the SCP 302. At this time, the interoperation between the Coloring player 304 and the CRS 306 may be performed by adopting a module used in a RBT system of a switching point changing method as it is. The Coloring player 304 plays the sound source in the sending terminal (not illustrated) by using sound source information transmitted to the CRS 306.

In the meantime, according to the preferred embodiment of the present invention, communication protocol between the MSC 300 and the Coloring player 304 is ISDN User Part (ISUP) protocol and communication protocol between the Coloring player 304 and the SCP 302 is Intelligent Network Application Protocol (INAP).

The CRS 306 according to the preferred embodiment of the present invention transmits a sound source corresponding to the ID number of the receiving terminal 312, to the Coloring player 304. In order to provide the set RBT sound source for the Coloring player 304, the CRS 306 interoperates with the subscriber database 308 and the coloring database 310.

The subscriber database 308 stores personal information (name, residence number, sex, address, etc) of a subscriber who has subscribed to the RBT service according to the preferred embodiment of the present invention, the ID number of a mobile communication terminal, a subscribed additional service, and the like. Therefore, the CRS 306 obtains information (data name, route, etc) of RBT sound source data set by the receiving terminal 312, using the subscribed additional service information and the ID number of the terminal stored in the subscriber database 308.

The coloring database stores various formats of RBT sound source data provided by the CRS 306 according to the preferred embodiment of the present invention. It will be preferable that RBT sound source data to be stored in the coloring database 310 should be classified and stored. Thus, the Coloring player 304, having obtained information on name and route of RBT sound source data to be transmitted thereto 304 through the subscriber database 308, transmits corresponding RBT sound source data by searching the coloring database 310 and abstracting the RBT sound source data.

In the meantime, the CRS 306 according to the preferred embodiment of the present invention may be configured including the aforementioned subscriber database 308 and coloring database 310.

Furthermore, according to the preferred embodiment of the present invention, communication protocol between the Coloring player 304 and the CRS 306 uses Transmission Control Protocol/Internet Protocol (TCP/IP).

Furthermore, the receiving terminal 312 and the sending terminal according to the preferred embodiment of the present invention may be a PDA, a cellular phone, a PCS phone, a hand-held PC, a GSM phone, a W-CDMA phone, an EV-DO phone, an EV-DV (data and voice) phone, a MBS (mobile broadband system) and the like.

Figure 4:
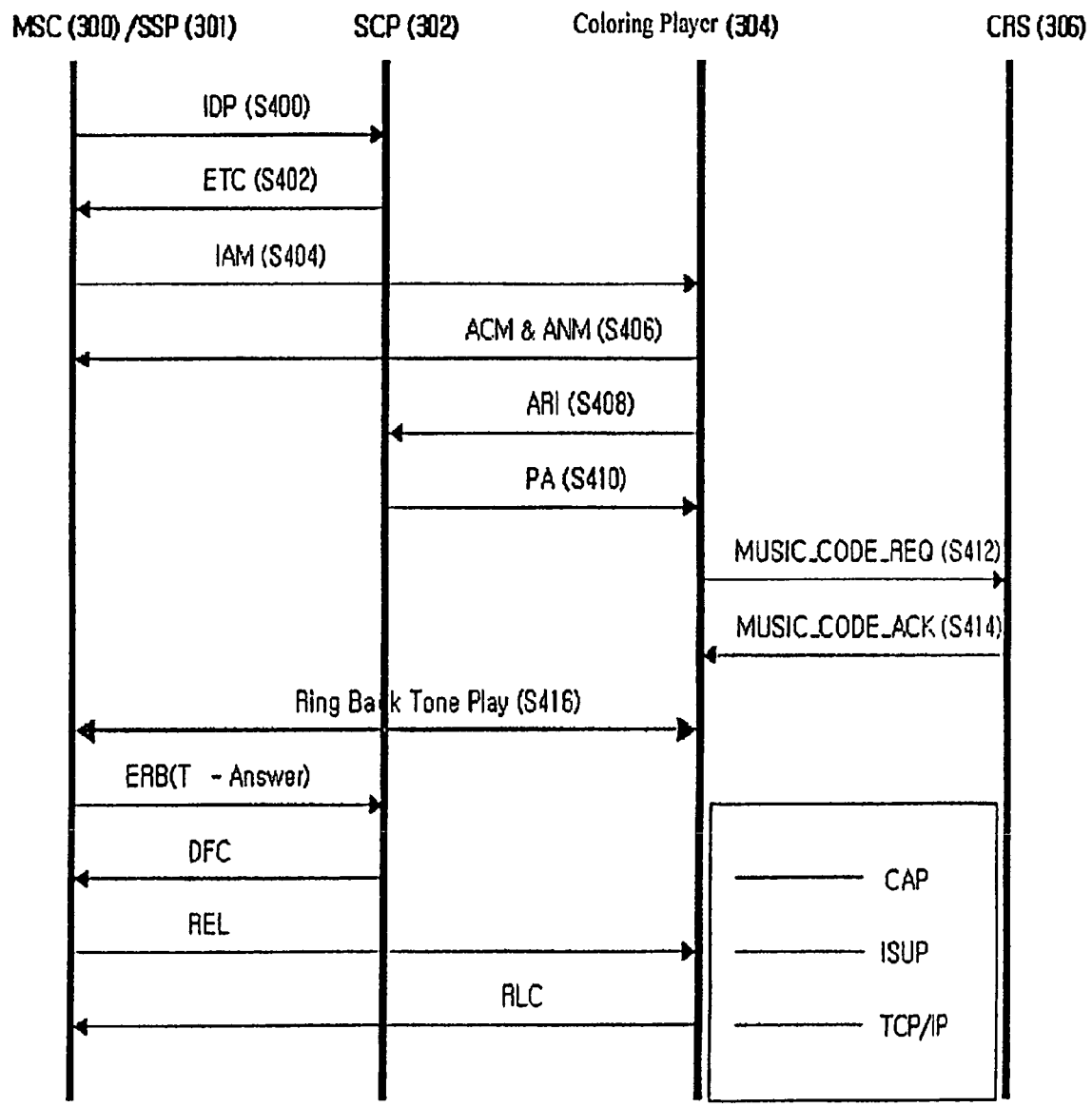
FIG. 4 is a drawing illustrating a process of providing the ring back tone service in the intelligent network according to the preferred embodiment of the present invention.

FIG. 4 is a drawing illustrating a process of providing the ring back tone service in the intelligent network according to the preferred embodiment of the present invention.

First, the SSP 301, connected to the MSC 300 of the receiving terminal 312 which is required for call receipt, transmits information on the receiving terminal 312 to the SCP 302 (S400). At this time, information on the receiving terminal 312 received by the SCP 302 may be the ID number of the receiving terminal 312, information on the additional service subscription thereof or the like.

In case that the MSC 300 receives a response message from the SCP 302 that the receiving terminal 312 has subscribed to the RBT service (S402), the MSC 300 transmits a call connection request message to the Coloring player 304 (S404) and receives a response message in relation thereto (S406) whereby a communication line is formed between the MSC 300 and the Coloring player 304. At this time, the call connection request message may include ID number information on the sending terminal (not illustrated) having requested the call connection.

In case that the communication line is formed between the MSC 300 and the Coloring player 304, the Coloring player 304 transmits the ARI to the SCP 302 (S408). The SCP 302 that has received the ARI, generates an AP message using the received information on the receiving terminal 312, so as to transmit the generated AP message to the Coloring player 304 (S410). At this time, a random value is stored in a field for RBT sound source of the AP message and the ID number of the receiving terminal 312 is stored in an extension field and then transmitted.

In the meantime, in case that the ID number of the sending terminal (not illustrated) having requested the call connection is not included in the call connection request message transmitted from the MSC 300 to the Coloring player 304, the SCP 302 transmits ID number information on the sending terminal (not illustrated) to the PA message together with ID number information on the receiving terminal 312.

The Coloring player 304 having received the PA message asks the CRS 306 for sound source information on the receiving terminal 312 (S412). This requires the ID number of the receiving terminal 312, which is included in the PA message received from the SCP 302. At this time, the Coloring player 304 recognizes only parameter promised to transfer the ID number of the receiving terminal 312, from the PA message received from the SCP 302 and ignores a value to be transferred to other parameters. As aforementioned, in case that the ID number of the sending terminal (not illustrated) having requested call connection is not included in the call connection request message, the Coloring player 304 recognizes a parameter promised to transfer the ID number of the receiving terminal 312 and the ID number of the sending terminal (not illustrated), from the PA message.

The CRS 306, having received a question with respect to sound source information from the Coloring player 304, searches the subscriber database 308 to find out information on the RBT sound source of the receiving terminal 312. The CRS 306, having obtained a name and route of RBT sound source data to be transmitted to the sending terminal (not illustrated) through the subscriber database 308, searches the coloring database 310 and abstracts corresponding RBT sound source data, so as to transmit the same to the Coloring player 304 (S414).

The Coloring player 304, having received the sound source corresponding to the ID number of the receiving terminal 312 from the CRS 306, plays the RBT sound source in the sending terminal (not illustrated) having required call receipt (S416).

In the meantime, an IDP message, an ETC message, an ARI message, a PA message, an ERB message, a DFC message and the like are formats of messages used in INAP recommended by ITU-T. In addition, a MUSIC_CODE_REQ message, a MUSIC_CODE_ACK message and the like are formats of messages used in TCP/IP protocol.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

INDUSTRIAL APPLICABILITY

As aforementioned, while the total number of transmitting/receiving messages is 6 times before the Intelligent Peripheral (IP) plays the sound source in the prior art, the total number of transmitting/receiving messages reduces to 4 before the Coloring player according to the preferred embodiment of the present invention plays the sound source. Therefore, according to the present invention, since the response time reduces in comparison with the prior art, there is an effect that it is possible to obtain a quick response.

Furthermore, according to the present invention, since separate apparatus such as a Signaling Gateway (SG) is not required by removing interoperation between a Service Control Point (SCP) and a Coloring Server (CRS), there is an advantage that additional cost does not occur. In addition, since there is no need of settlement between manufacturers required for interoperation between the SCP and the CRS, there are advantages that cost spent for the settlement does not occur and time for embodying the service may be reduced. In addition, there is an effect that overloading of the SCP may be reduced compared with the prior art by removing the interoperation between the SCP and the CRS.

Furthermore, according to the present invention, since the CRS directly interoperates with the Coloring player, there is an advantage that it becomes possible to recycle the interoperation standard and module therebetween, which is used in the existing switching point method.

The invention claimed is:

1. A method for providing a ring back tone service by using a Play Announcement (PA) message based on an intelligent network, the method comprising the steps of:
    (a) receiving information on a receiving terminal from a Mobile Switching Center (MSC) on the side of the receiving terminal that is required for call receipt;
    (b) if the receiving terminal subscribes to the ring back tone service, forming a communication line between the MSC and a coloring player;
    (c) if the communication line is formed, receiving an Assist Request Instruction from the coloring player;
    (d) transmitting the PA message including an identification number of the receiving terminal, to the coloring player; and
    (e) enabling a sound source corresponding to the identification number of the receiving terminal included in the PA message to be transmitted from a coloring server to the coloring player, such that the sound source is played.

2. The method of claim 1, wherein communication protocol between the coloring player and the coloring server is Transmission Control Protocol/Internet Protocol (TCP/IP).

3. The method of claim 1, wherein the coloring player recognizes an identification number parameter of the receiving terminal and/or an identification number parameter of a sending terminal that has required the call receipt.

4. The method of claim 1, wherein the coloring player directly interoperates with the coloring server.

5. The method of claim 1, wherein the information of the receiving terminal includes the identification number thereof and/or information on subscription of additional service thereof.

6. The method of claim 1, wherein the mobile switching center includes a Service Switching Point (SSP) supporting the entire access of the intelligent network.

7. The method of claim 1, wherein the PA message includes an identification number of a sending terminal that has required the call receipt.

8. A system for providing a ring back tone service by using a Play Announcement (PA) message based on an intelligent network, the system comprising:
    a Mobile Switching Center (MSC) transmitting information of a receiving terminal that is required for call receipt and interoperating with a coloring player after said player sends an Assist Request Instruction;
    a Service Control Point (SCP) receiving the information of the receiving terminal from the MSC, to transmit the PA message including an identification number of the receiving terminal;
    a coloring player receiving a sound source corresponding to the identification number of the receiving terminal, to play the same in a sending terminal that has required the call receipt; and
    a Coloring server transmitting the sound source corresponding to the identification number of the receiving terminal to the coloring player.

9. The system of claim 8, further comprising:
    a coloring database storing at least one ring back tone sound source data; and
    a subscriber database storing personal information on a subscriber who has subscribed to the ring back tone service and information on the ring back tone sound source data selected by each subscriber.

10. The system of claim 8, wherein the coloring server comprises a coloring database storing at least one ring back tone sound source data and a subscriber database storing personal information on a subscriber who has subscribed to the ring back tone service and information on the ring back tone sound source data selected by each subscriber.

11. The system of claim 8, wherein the MSC includes a Service Switching Point (SSP) supporting the entire access of the intelligent network.

12. The system of claim 8, wherein in case that a communication line is formed between the MSC and the coloring player, the coloring player transmits an Assist Request Instruction to the SCP.

13. The system of claim 8, wherein communication protocol between the MSC and the SCP and/or between the coloring player and the SCP is Intelligent Network Application Protocol (INAP).

14. The system of claim 8, wherein communication protocol between the MSC and the coloring player is ISDN user part (ISUP) protocol.

15. The system of claim 8, wherein communication protocol between the coloring player and the coloring server is Transmission Control Protocol/Internet Protocol (TCP/IP).

16. The system of claim 8, wherein the coloring player recognizes an identification number parameter of the receiving terminal and/or an identification number parameter of a sending terminal that has required the call receipt, from the PA message.

17. The system of claim 8, wherein the coloring player directly interoperates with the coloring server.

18. The system of claim 8, wherein the information on the receiving terminal includes the identification number thereof and/or information on subscription of additional service thereof.

19. The system of claim 8, wherein the receiving terminal and the sending terminal include a Personal Digital Assistant (PDA), a cellular phone, a Personal Communication Service (PCS) phone, a hand-held PC, a Global System for Mobile (GSM) phone, a wideband CDMA phone, an EV-DO phone, an EV-data and voice (DV) phone and a Mobile Broadband System (MBS) phone.

20. The system of claim 8, wherein the Play Announcement message includes the identification number of the sending terminal.

* * * * *